United States Patent [19]

Fortunato

[11] 4,271,597

[45] Jun. 9, 1981

[54] METHOD AND APPARATUS FOR MASTERKEYING

[76] Inventor: Louis F. Fortunato, 2510 Audrey Ter., Union, N.J. 07083

[21] Appl. No.: 62,360

[22] Filed: Jul. 31, 1979

[51] Int. Cl.$^{3}$ .......................... G01B 3/00; G01B 5/00

[52] U.S. Cl. .......................... 33/174 F; 70/392

[58] Field of Search .......................... 33/174 R, 174 F; 70/337, 369, 392

[56] References Cited

U.S. PATENT DOCUMENTS

| | | | |
|---|---|---|---|
| Re. 26,848 | 4/1970 | Simon | 90/13.05 |
| 1,207,217 | 12/1916 | Ross | 33/174 F |
| 2,070,228 | 2/1937 | Fitzgerald | 33/174 F |
| 2,510,998 | 6/1950 | O'Brien | 33/174 F |
| 2,667,423 | 5/1954 | Uher | 164/50 |
| 2,707,335 | 5/1955 | Falk | 33/174 F |
| 2,707,410 | 5/1955 | Falk | 33/174 F |
| 3,113,386 | 12/1963 | Bolfar | 33/174 F |
| 3,535,794 | 10/1970 | Singer | 33/174 F |
| 3,775,855 | 12/1973 | Marmel | 33/174 F |

*Primary Examiner*—Richard R. Stearns
*Attorney, Agent, or Firm*—Martha G. Pugh

[57] ABSTRACT

Method and apparatus for making a plurality of different keys, each constructed to open each rotary cylinder lock in the same series, or sub-series, called "masterkeying". The disclosed masterkeying tool comprises a calibrated plate, having one or more pin grooves, and a key-supporting platform which moves transversely to permit a selected bitting of a test key to register with a selected pin groove on the calibrated plate. Tumbler pins interposed in the pin groove are seated in a selected bitting of the test key and are aligned in the groove to reach the indicated shear line.

The process is repeated for corresponding bittings in each of a series of keys, beginning with the key having the highest bitting and ending with the key having the lowest bitting. The aligned pins for each bitting are removed in order and interposed in the corresponding holes in the lock-cylinder plug, so that the corresponding bittings of any one of the test keys interposed through the keyway, will lift up the spring-biased pins above the shear line, releasing the plug to rotate in the cylinder and open the lock.

A three piece and a two piece tool embodiment are disclosed.

7 Claims, 13 Drawing Figures

FIG. 8
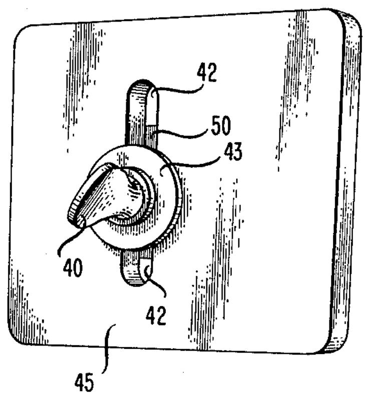
FIG. 9
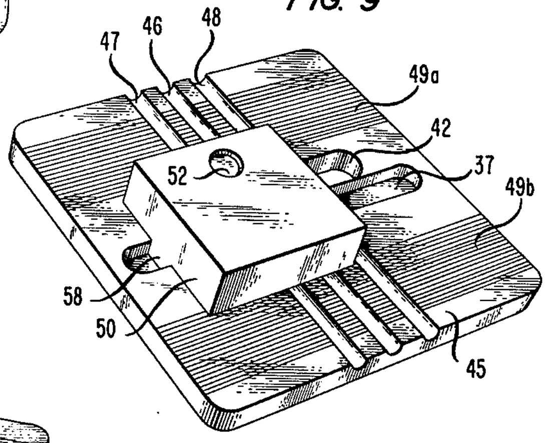
FIG. 10
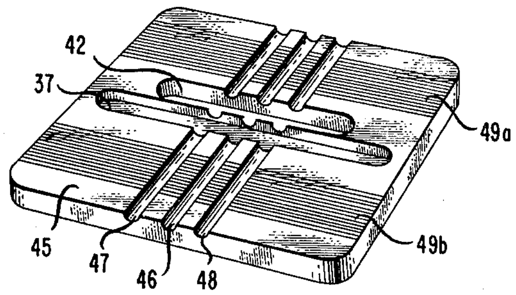
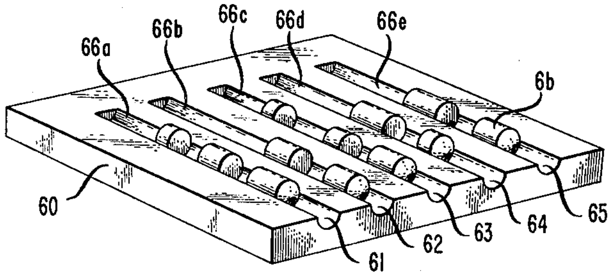
FIG. 12

METHOD AND APPARATUS FOR MASTERKEYING

BACKGROUND OF THE INVENTION

This invention relates in general to making keys for rotary cylinder locks, and more particularly to a process and apparatus for making a plurality of different keys to open each lock in the same series, or sub-series, called "masterkeying".

A conventional rotary cylinder lock comprises an external portion of cylindrical cross-section, called "the cylinder", and a smaller internal, eccentrically-disposed cylinder called "the plug" having an inwardly projecting slot called "the keyway". Projecting normally into the keyway at spaced-apart positions along the axis of the plug are a series of "pin holes". The latter register with similar "pin holes" in the cylinder, each of which accomodates a small coil spring. Each of these springs presses against a plurality of aligned tumbler pins. When a key is pressed into the keyway, the lateral cuts or "bittings" in the key may function to seat in the bottom one of the aligned pins, raising the aligned pins up above what is called "the shear line", so that the interface between two pins coincides with the shear line, and the plug is disengaged from the cylinder and rotates to open the lock.

In accordance with prior art masterkeying practice, tumbler pins are interposed blindly into the small pin holes in the plug by guessing at the lengths of the pins needed to extend from the selected bitting of the key under test up to the shear line where the plug engages the internal surface of the cylinder. This process is cumbersome, and involves much time and patience, especially when there are three or four or more masterkeys which must be used to open a single lock, such as is the case in motels, hotels, apartment houses, public buildings, and public and private institutions.

SHORT DESCRIPTION OF THE INVENTION

It is therefore the principal object of the present invention to improve the process called "masterkeying", more particularly, by providing a process of open visual tumbler pinning, which is more accurate, requiring less repetition than the prior art process, and is therefore a substantial time saver.

Accordingly, this application discloses an improved masterkeying method and apparatus for making a plurality of different keys, each constructed to open the same series, or sub-series, of cylinder locks. The masterkeying tool, in accordance with the present invention, includes a platform for the test keys which is slidably disposed to be secured in a selected position against the face of a calibrated scale engraved with one or more pin grooves normal to the supporting surface. The "shear line", which corresponds to the diameter of the plug of the rotary lock cylinder, is indicated on the calibrated scale against which each of the test keys is matched, so that a selected bitting registers with one of the grooves. Each of the keys is taken in order, one bitting at a time, beginning with the key for which the selected bitting is highest. As each key is held in position, a tumbler pin is seated in the bitting in question and additional pins are interposed until the pin alignment in the groove extends up to the shear line. This alignment of tumbler pins remains in place, and is added to, for a corresponding bitting on each key, the process being repeated until the necessary pins are added using the key in which the particular bitting is lowest. At this point, the aligned pins are transferred in the proper sequence to a holding tray or directly to the pin hole of the lock plug corresponding to the selected bitting. This process is repeated for corresponding bittings in all the test keys. Thus, any one of the test keys interposed through the keyway of one of the locks of the series will engage in its bittings the bottom pins in all the pin holes to raise up the pin alignments above the shear line in each case, causing the lock to open.

One embodiment of a masterkeying tool according to the present invention, comprises three pieces. A calibrated plate having a plurality of parallel pin grooves running the length of the plate, and calibration lines normal to the grooves across the width of the plate, is mounted in a rectangular slot in an elongated supporting block for slidable to-and-fro motion in the length direction of the pin grooves. A second platform block, having a trapezoidal slot in its upper face to accommodate the test keys, is mounted against the face of the supporting block so that it moves slidably across the width of the calibrated plate. Each of these bocks is secured in position by a set-screw. The test key is mounted in the trapezoidal slot against the face of the calibrated plate, and the supporting platform is moved back and forth until the selected bitting on the test key registers with the selected pin groove. The calibrated plate is adjusted longitudinally and set in position so that the length protruding above the platform is equal to the diameter of the plug, thus simulating the shear line. The operator then proceeds to put the pins in the grooves until the shear line is reached for the selected bitting on each of the test keys, as previously described.

A second two-piece embodiment comprises a rectangular plate having three spaced-apart parallel pin grooves running in one direction across the plate, and a plurality of parallel calibration lines running normal to the pin grooves. A rectangular key-supporting block has a projection which rides in a slot transversely extended with respect to the pin grooves, which block is fixed in position with a set-screw. Thus, when the test key is placed on the supporting block it can be adjusted to register with a selected pin groove, the pins being placed in the groove as previously described.

The principal advantage of the method and apparatus of the present invention is that it permits the pins to be interposed visually into a pin groove registered with the selected bitting, thus avoiding blind pinning in a hole as was done in the prior art. This method is much more accurate than the prior art, and also requires less time and patience. Further, in the duplication of a key by the prior art method, the spacing or depth of cutting of the bittings can be slightly off, thereby making the duplicate useless. Such discrepancies can be detected by comparing the original key with the duplicate on the platform of the pinning device of the present invention, and filing the bittings on the duplicate to the correct height. If one thus detects the defect, the keymaking machine can be properly adjusted.

These and other objects, features and advantages of the present invention will be understood by those skilled in the art, from a study of the specification hereafter with reference to the appended drawings.

SHORT DESCRIPTION OF THE DRAWINGS

FIGS. 8 and 9, respectively, show the rear and front sides of a modified two-part keying device in accordance with the present invention.

FIG. 10 is a perspective showing of the calibrated plate of FIG. 9, disassembled from the combination, looking at the upper side.

Figure 11:
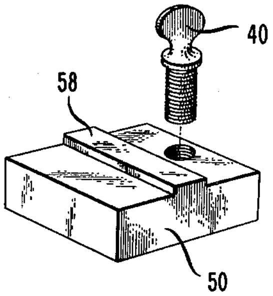

FIG. 11 is a perspective showing of the platform of FIG. 9, disassembled from the combination, looking at the underside.

FIG. 12 shows in perspective, a pin tray including the pins arranged to illustrate the masterkeying process of the present invention.

DETAILED DESCRIPTION OF THE INVENTION

In order to give the reader a better understanding of the process of the present invention, the working parts of a conventional rotary lock will be briefly described.

Figure 1:
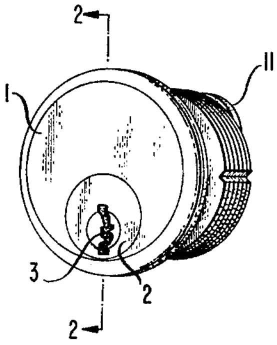
FIG. 1 is a showing, in perspective, of a cylinder of a conventional rotary cylinder lock including a plug and keyway.
Figure 2:
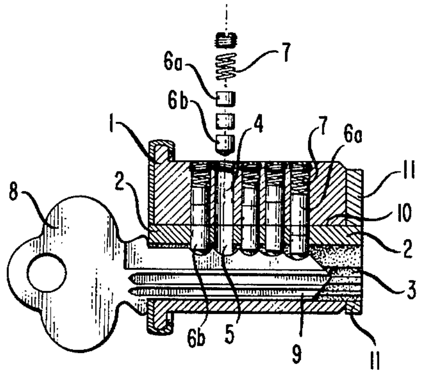
FIG. 2 is a longitudinal section of the cylinder along the plane indicated by the arrows 2—2 of FIG. 1, showing aligned tumbler pins disposed in pin holes of the cylinder and the plug so as to move against the compression of interposed springs.

Referring to FIG. 1, there is shown the face, say 1¼ inches in diameter, of a conventional cylinder lock 1, which in the present embodiment may be of brass or similar metal. As indicated in the sectional showing of FIG. 2, this has an internal eccentric cylindrical bore, about ⅝ inch in diameter, which is arranged so that its lower periphery is nearly tangential with the lower surface of cylinder 1. A cylindrical plug 2 is mounted in flush rotatable relation in the internal bore of cylinder 1. Plug 2 may be formed of stainless steel or other non-corrosive metal, and contains a conventional keyway slot 3 interposed longitudinally in substantially diametric relation to the plug. FIG. 2 shows a plurality of diametrical bores 4, each about ⅛ inch in diameter, disposed in parallel relation with their centers aligned, say 3/16 inch apart on cylinder 1.

Figure 3:
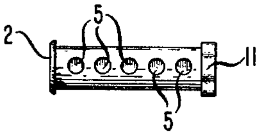
FIG. 3 is a view looking down on top of the plug, removed from the cylinder, showing a plurality of vertically-disposed pin holes.

The plug 2 has a series of matching parallel bores 5, as shown in the top view thereof, in FIG. 3, which register with the bores 4 when the plug 2 is in place in cylinder 1. Interposed in aligned relation in each of the bores 5 are series of tumbler pins *6b*. A small coil spring 7 is interposed in each of the bores 4 so as to bear down on aligned pins *6a*, in the bores 4, and pins *6b*, in bores 5. When a proper key 8 having a series of lateral cuts 9 (called "bittings") is pushed laterally into the keyway 3, the bottoms of the aligned pins *6b* in each of the bores 5 are engaged by each of the bittings 9 of the series, pushing up the aligned pins *6b*, *6a* against the compression of the springs 7. If the key fits, the pins *6a* and *6b* aligned in each of the bores 5 are pushed up the precise amount required so that an interface between the upper and lower ends of a pair of pins, in each bore, coincides with the "shear line" 10 at which the cylindrical outer surface of plug 2 engages the cylinder inner surface of cylinder 1. Thus, the plug 2 is free to move rotatably with reference to the cylinder 1, releasing the lock to open.

In prior art practice, each of the pins *6a*, *6b* is placed by tweezers into the cylinder bores 4, and aligned plug bores 5, with the test key 8 in place, the operator "guessing" when the aligned pins *6a*,*6b* extend up to the shear line 10. This is a tedious and painstaking process, which is performed "blind", and often has to be repeated because of an incorrect alignment of pins.

Figure 4:
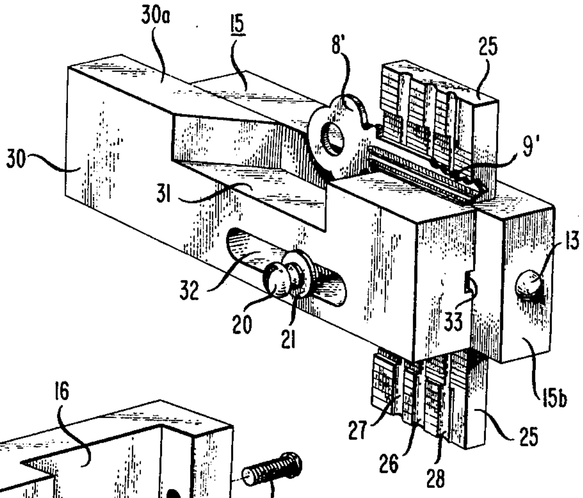
FIG. 4 shows, in perspective, a three-part embodiment of the master-keying device of the present invention.

To avoid this inconvenience, and increases the accuracy of the pinning process, the applicant has invented a new process and apparatus for pinning, one three-piece embodiment of which is shown in FIG. 4 of the drawings.

Figure 5:
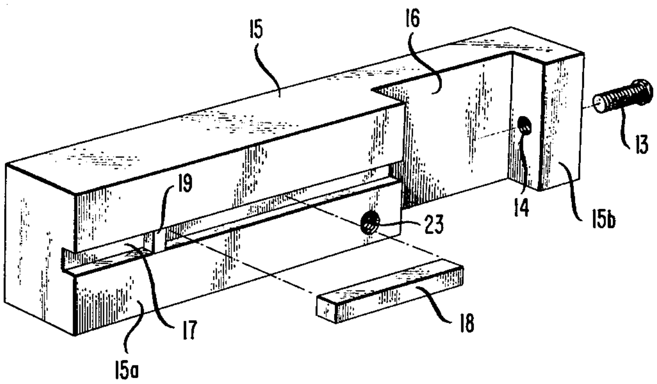
FIGS. 5 and 6 are perspective showings of the platform of FIG. 4 and the calibrated plate having a graduated scale, disassembled.

A supporting block 15, shown disassembled in FIG. 5, may be of any rigid material, preferably metal such as stainless steel or aluminum, 3¾ inches long, one inch wide, and ½ inch thick. This has a substantially square identation 16 which is ¼ inch deep, located ¼ inch in from one of the short edges, and 1 inch wide, extending through the width of the block. The raised supporting surface *15a*, adjacent and to the left of the indentation 16 in the plane of the drawing, has a central rectangular slot 17 extending longitudinally along its entire length. Slot 17 is ⅜ inch wide and 3/16 inch deep, and accommodates a rectangular slider bar 18, which is 1⅜ inches long by 3/16 inch square in cross-section. Slider 18 may be magnetized to keep it from falling out of slot 17, which is provided with a stop 19 about ½ inch from the outer edge.

Adjacent the indentation 16, to the right, is the surface *15a*, which is bored with a ⅛ inch screw hole 23, passing completely through the thickness, for accommodating the end of a long set-screw 20, in a manner to be described hereinafter, as shown in FIG. 4.

Substantially centered in the external wall of flange *15b*, which is formed between the short edge of block 15 and rectangular indentation 16, is a second ⅛ inch screw hole 14 through the wall thickness for accommodating a second, short set-screw 13.

Figure 6:
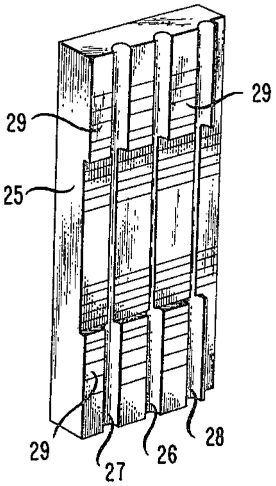

A calibrated rectangular plate 25; (See FIG. 6) just under 1 inch wide, 2½ inches long, and ¼ inch in overall thickness, has three parallel pin grooves 26, 27 and 28 running the length of one of its major faces. The center pin groove 26, of rounded contour, is 20 mils in diameter, whereas the two grooves 27 and 28 on opposite sides of the center groove are each 35 mils in diameter. The calibration lines 29 are marked at intervals of 0.05 inches across the width of calibrated plate 25. The calibrated plate 25 fits in flush slidable relation into the indentation 16, where it is fixed in a desired position by the set-screw 13.

Figure 7A:
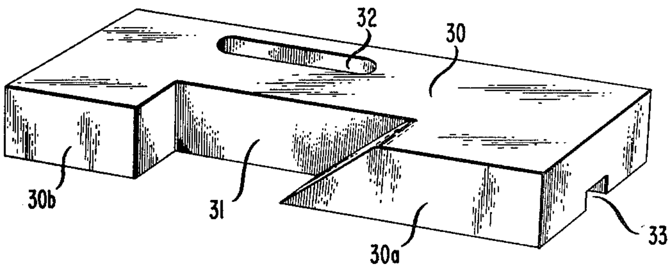
FIGS. 7A and 7B, are perspective showings from the top, and from one side, respectively of the supporting block of FIG. 4.
Figure 7B:
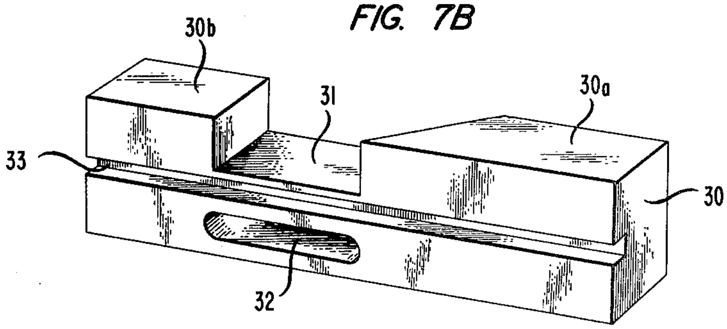

The key platform 30 (FIG. 7A) is formed from any rigid material, preferably a block of metal (which may, for example, be stainless steel or aluminum), 3 inches long, one inch wide and ½ inch thick. One of its major lateral faces has a centered rectangular groove 33, (See FIG. 7B), running the entire length, which is ⅜ inch wide and 3/16 inch deep, corresponding to the groove 17 on platform block 15. When the blocks 15 and 30 are disposed in flush relation, side to side, the two grooves 17 and 33 form a central rectangular bore, accommodating the rectangular slider bar 18 between them, on which they ride and move slidably relative to one another in a lateral direction. The upper face of the block 30 has a trapezoidal indentation 31 which is 5/16 inch deep for accommodating test keys. The cut extends through the thickness of the block forming a wall normal to the lateral surfaces of the block, one inch in from the inner end thereby providing a rectangular surface 30*b* to the left of indentation 31 (FIG. 7B) on which the shank of the test keys rest. The wall on the right-hand side of indentation 31 forms a roughly 45 degree angle with the lateral walls of the block, so that the surface 30*a* is 1⅝ inches across the rear and about 1⅛ inches across the front.

A slot 32, which is 1¼ inches long and ⅜ inch wide, rounded at the ends, is drilled through the thickness of block 30, and is below and parallel to the inner end of indentation 31. This registers with the screw hole 23 on block 15, the latter and slot 32, together accommodating the long set-screw 20 and washer 21 for securing the block 30 in the desired lateral position to block 15. Thus, when the shank of a test key 8′ rests on the platform 30*b*, (See FIG. 4) the relative positions of the two blocks are adjusted so that a desired one of bittings 9′ coincides with the central pin grooves 26, or a selected one of the lateral pin grooves 27 or 28.

Prior to key testing operations, the plug 2 is first placed on the platform 30*b* to measure the position of the shear line against the calibration lines 29, the extent of calibration plate 25 normal to the surface 30*b* being fixed by the set-screw 13.

An alternative, simplified two-piece embodiment of the masterkeying tool of the present invention is shown in FIGS. 8–11 of the drawings. The back and front of this simplified embodiment are respectively shown in perspective in FIGS. 8 and 9 of the drawings, the calibrated plate 45 and key supporting platform 50 being shown disassembled in FIGS. 10 and 11. Like the earlier embodiment, this can be formed of any rigid material, preferably metal, such as stainless steel or aluminum.

The calibrated plate 45 is roughly 2½ inches square, and ¼ inch thick, having rounded corners. The inner face of 45 is drilled with three centered symmetrically-spaced parallel grooves 46, 47 and 48 of rounded cross section, ¼ inch apart, which extend across its width. The middle groove 46 is 20 mils across and the lateral grooves, 47 and 48 are each 35 mils across. Normal to the grooves 46, 47 and 48, are two groups, 49*a* and 49*b*, of twelve fine calibration lines each, the centers of the lines being spaced apart 5 mils. The outer lines of each of group 49*a* and 49*b* are spaced about ⅜ inch from the respective edges; and the innermost lines of each group are spaced about one inch apart. Centered between, and running parallel to the innermost calibration lines 49*a* and 49*b*, is an indentation 37 of rectangular cross-section ⅜ inch wide and 3/16 inch deep. The indentation 37 extends nearly across the width of plates 45, terminating about ⅛ inch from each lateral edge of the plate in a rounded end-wall. Adjacent to and running parallel to one side of the indentation 37 is a slot 42 extending through the thickness of plate 45. This is ¼ inch wide, and about 2 1/16 inches long, being centered across the width of plate 45, and also having rounded end-walls.

A key-supporting platform 50, (FIG. 11) which can been of any rigid material, but in preferred form is a rectangular metal block of, say, aluminum or stainless steel, is one inch square, and 7/16 inch thick. Centered across the width of the inner surface of block 50 is a protruding keying guide 58, of rectangular cross-section, about 3/17 inch wide and ⅛ inch thick, which is accommodated to move slidably in the indentation 37. Centered about ¼ inch down from the upper edge, and ½ inch in from the lateral edges of key-supporting platform 50 is a screw hole 52 which is constructed to accommodate the set-screw 40, so that the block 50 moves to and fro in the slot 42 until the desired position is reached, at which position set-screw 40 is tightened in place against the washer 43 which bears on the rear surface of calibrated plate 45 as shown in FIG. 8. In this embodiment, the test key is mounted with its shank resting on the upper surface of supporting platform 50 so that the grooves 46, 47 and 48 are normal to the key bittings, the desired bitting of the test key being registered with the selected groove.

Key Pinning Operation

The function of the devices of the invention and the method of operation presently described is to properly align the tumbler pins in a rotary cylinder lock of the type described with reference to FIGS. 1–3 so that one or more master keys can open the same lock.

The method of key pinning in accordance with the present invention includes the following steps:

STEP 1

The test key 8 to be used in the selected lock plug 2 are first numbered.

STEP 2

The keys are placed side by side on platform 30*b* of the three-part pinning device of FIG. 4, (or on the platform 50*a* of a two-part pinning device of FIG. 9) to determine highest bitting of each key, and a chart is made to indicate the keys in order, as shown in the sample chart.

STEP 3

The shear line of plug 2 is transferred onto the graduated plate 25 of FIG. 4 (or graduated plate 45 of FIG. 9) by putting plug 2 on the respective pinning device platform 30*b* (or 50*a*). The shear line may be indicated by stretching masking tape across the graduated plate.

| | Sample Bittings Chart | | | | |
|---|---|---|---|---|---|
| | First | Second | Third | Fourth | Fifth |
| Order of | Key #3 | Key #1 | Key #1 | Key #1 | Key #2 |
| Bitting Heights | Key #1 | Key #3 | Key #2 | Key #3 | Key #1 |
| from Highest | Key #2 | Key #4 | Key #3 | Key #2 | Key #4 |
| to Lowest | Key #4 | Key #2 | Key #4 | Key #4 | Key #3 |

A check or test can be made to determine if the designated shear line is correct by placing one of the test keys 8 in the plug, and placing pins in one of holes 6*b* to reach the highest bitting of the test key 8. The pins are then removed by tweezers from the selected hole 6*b* and placed in the groove registered with the same bitting of the same key, placed on platform 30*b*. A check is then made to determine if the shear line, as marked on plate 25, (or plate 45), has been satisfied.

STEP 4

The keys are next pinned in order of number indicated on the Sample Bittings Chart, to wit:

Key #3 is pinned first (highest bitting);

Key #1 is pinned second (second highest bitting);

Key #2 is pinned third (third and);

Key #4 is pinned fourth (fourth highest bitting).

It will be noted that the keys may have bitting edges curving either to the right, to the left, or direct center, without curving in either direction. If the bitting is of a direct center type, the center groove of the pinning device is used. If the curvatures are to the left or right, the appropriate lateral groove is used, for placing the pins directly over the bitting cut of the test key.

STEP 5

Having established the shear line on the calibrated plate 25 (or 45) of the pinning device, and the order in which the keys to be pinned, the operator is ready to proceed.

In accordance with the Sample Bittings Chart:

(a) Key #3 is placed on platform 30*b* of the device of FIG. 4, (or on 50*a* of the device of FIG. 9), so that the first bitting registers with the correct groove. The proper sized bottom pin 6*b* is selected, to reach the shear line according to graduated lines on the calibrated plate 25 (or 45).

(b) Key #3 is removed; and key #1 is placed on the platform 30*b* (or 50*a*) with tweezers; then the bottom pin is pushed or slid along in the groove until it seats in the first bitting of key #1. The space above the bottom pin and the shear line is filled with a proper top or master pin.

(c) Key #1 is removed and replaced with key #2. With tweezers, the pins are pushed down in the groove to seat in the first bitting of key #2. Again, the spaces between the top of pin and the shear line are filled with a proper master pin.

(d) Key #2 is removed, and replaced by key #4 on platform 30*b* (or 50*a*) of the respective pinning device. Pins are pushed down in the groove to seat in the first bitting of key #4. Again, the void below the shear line is filled with proper master pin.

STEP 6

Having completed the first bitting of all keys, the operator removes all of the pins in proper sequence and places them in pin tray 60 (see FIG. 12). Alternatively, the pins may be placed in sequence directly into the holes 6*b* of plug 3 after they have received proper filing or deburring.

STEP 7

The above procedure is repeated in the case of the second bitting for all keys.

STEP 8

Again, the above procedure is repeated for the third bitting for all keys,—and so forth, until all of the bittings for each of the test keys has been pinned. It should be noted that the pinning device should be held or placed in a horizontal position, or at most, on a 30 degree incline, so that pins will not slide down the groove when keys are changed.

In a system of locks and keys suitable for hotels, motels, and public and private institutions of all kinds, it is often desirable to have one grand master key adapted to open all locks and various submaster keys adapted to unlock only a selected portion of the locks, say, on a single floor or in a single corridor. It will be understood that each of the locks in the system must be pinned to respond to the grand master key and one or more submaster keys, in addition to the individual room key. Therefore, the pinning process must be repeated for each lock in the system, using for each such lock the grand master key, the submaster keys, and the individual lock key which will be utilized to open that particular lock.

It will be understood that the present invention is not limited to the particular devices or method steps herein described by way of example, but only by the scope of the appended claims.

What I claim is:

1. A device to facilitate the arrangement of tumbler pins in a cylinder lock to correspond to selected bittings on one or more test keys which comprises in combination:

a calibrated plate having at least one elongated pin groove engraved thereon and a series of calibration lines disposed transversely to the direction of said elongated pin groove;

a key-supporting platform for said test keys disposed for slidable motion to and fro against face of said calibrated plate in a direction normal to the principal direction of said at least one pin groove and constructed to be secured in a selected position to register a preselected bitting of said test key with said pin groove.

2. A three-piece device in accordance with claim 1:

wherein said calibration plate is oblong in shape and said at least one pin groove runs in the length direction of said plate;

an elongated plate supporting block having a rectangular indentation across the width thereof adjacent one end for accommodating said oblong calibration plate to move in slidable relation in its length direction normal to the length of said supporting block and flush with its inner surface;

means comprising a first set-screw for securing said oblong calibrated plate at a selected longitudinal position in said indentation;

said key-supporting platform being in the form of an elongated block having a width substantially conforming to the width of said elongated plate supporting block;

said key-supporting platform block having a central indentation in the lateral face of said block for accommodating the head of a test key and forming at one end of said block a protrusion from the floor of said indentation having a plane surface for supporting the shank of said key against the face of said calibrated plate;

means for coupling said key-supporting platform block and said elongated plate supporting block for slidable motion along their inner surfaces and against the surface of said calibrated plate in a direction normal to the principal direction of said at least one pin groove;

and means comprising a second set-screw for securing said key-supporting platform and said plate supporting block in a desired relative position.

3. A device in accordance with claim 2 wherein:

said means for securing said key-supporting platform and said plate supporting block in a desired relative position comprises a longitudinal slot on the external lateral face of said key-supporting block which is constructed to register with a screw hole in said plate supporting block, and a set-screw interposed through said slot and said screw hole.

4. A two-piece device in accordance with claim 1 wherein the major surfaces of said calibrated plate are substantially square having a central groove running across the width thereof substantially normal to said at least one pin groove;

said key-supporting platform block being rectangular in shape and having length and width dimensions substantially smaller than the length and width dimensions of said calibrated plate, and a thickness dimension constructed to provide a platform for holding the shank of a test key against the face of said calibrated plate;

the inner major surface of said key-supporting platform block having a projecting flange centered across the width thereof which is constructed to key into and ride to and fro in said central groove to move said key-supporting platform back and forth against the face of said calibrated plate normal to the direction of said at least one pin groove;

wherein said means for securing said key supporting platform in a preselected position against the face of said calibrated plate comprises an elongated slot adjacent to and parallel to said central groove on said calibrated plate;

a screw hole in said key-supporting block which registers with said elongated slot when the projection on said key-supporting platform block is in engagement with the central groove of said calibrated plate;

a set-screw interposed into the slot of said calibrated plate and having a shank extending into the screw hole of said key-supporting block which registers with said elongated slot when the projecting flange of said key-supporting platform block is in engagement with the central groove of said calibrated plate.

5. A device in accordance with claims 2 or 4 wherein said at least one pin groove comprises three grooves in parallel relation, the two laterally-disposed grooves being of substantially larger cross-section than the central groove, so that said central pin groove is constructed to register with key bittings which are substantially straight up and said laterally disposed grooves are respectively disposed to register with key bittings which are curved to the right or to the left.

6. The method of making or testing a plurality of keys each constructed to open each of a series, or subseries, of rotary locks having a cylinder and a plug, called "masterkeying", which comprises the steps of:

providing an open calibrated plate having at least one pin groove running the length of said plate;

providing a key-supporting platform which is moved to and fro in a direction normal to said at least one pin groove;

measuring off the diameter of said plug on said platform against the face of said calibrated plate to determine the shear line;

placing all of the test keys on said platform with the corresponding bittings aligned against the face of said calibrated plate to determine in order the bitting cuts from the highest to the lowest key for each bitting;

placing each test key individually on the said platform in order, from the highest to the lowest for said first selected bitting, and aligning the first selected bitting of each to register with a selected pin groove;

seating tumbler pins in said first selected bitting of each respective test key until the alignment in the selected pin groove is built up to the shear line of said calibrated plate;

adding to the alignment in the said pin groove as each key is replaced with a key having a lower bitting to bring the alignment back up to the shear line;

when the first selected bitting has been pinned for all test kays, removing the aligned pins in order from the pin groove to the corresponding pin hole in the plug of said cylinder lock;

repeating the buildup of aligned pins in the selected pin groove for a second bitting using all of the test keys from highest to lowest of said second selected bitting;

when said second selected bitting has been pinned for all test keys, removed the aligned pins in order to the pin hole of the cylinder plug corresponding to the second selected bitting;

repeating the process until all of the selected bittings of all the test keys have been pinned and the pin alignments placed in the corresponding pin holes of the cylinder plug of the rotary lock in question.

7. The method in accordance with claim 6 in which the process is repeated for each lock in the series, or subseries, using all of the test keys.

* * * * *

UNITED STATES PATENT AND TRADEMARK OFFICE
CERTIFICATE OF CORRECTION

PATENT NO. : 4,271,597

DATED : June 9, 1981

INVENTOR(S) : Louis F. Fortunato

It is certified that error appears in the above-identified patent and that said Letters Patent are hereby corrected as shown below:

Col. 2, line 22, change "bocks" to ---blocks---;
Col. 6, line 60, change "registered" to ---registering---;
Col. 10, line 27, change "kays" to ---keys---;
Col. 10, line 35, change "removed" to ---removing---.

Signed and Sealed this

*Twenty-fifth* Day of *August 1981*

[SEAL]

*Attest:*

GERALD J. MOSSINGHOFF

*Attesting Officer* *Commissioner of Patents and Trademarks*